Sept. 15, 1953  H. WALLMAN  2,652,386
CONTINUOUS PREPARATION OF BEADED PHENOLSULFONIC
ACID-FORMALDEHYDE CONDENSATION PRODUCT
Filed Feb. 17, 1949
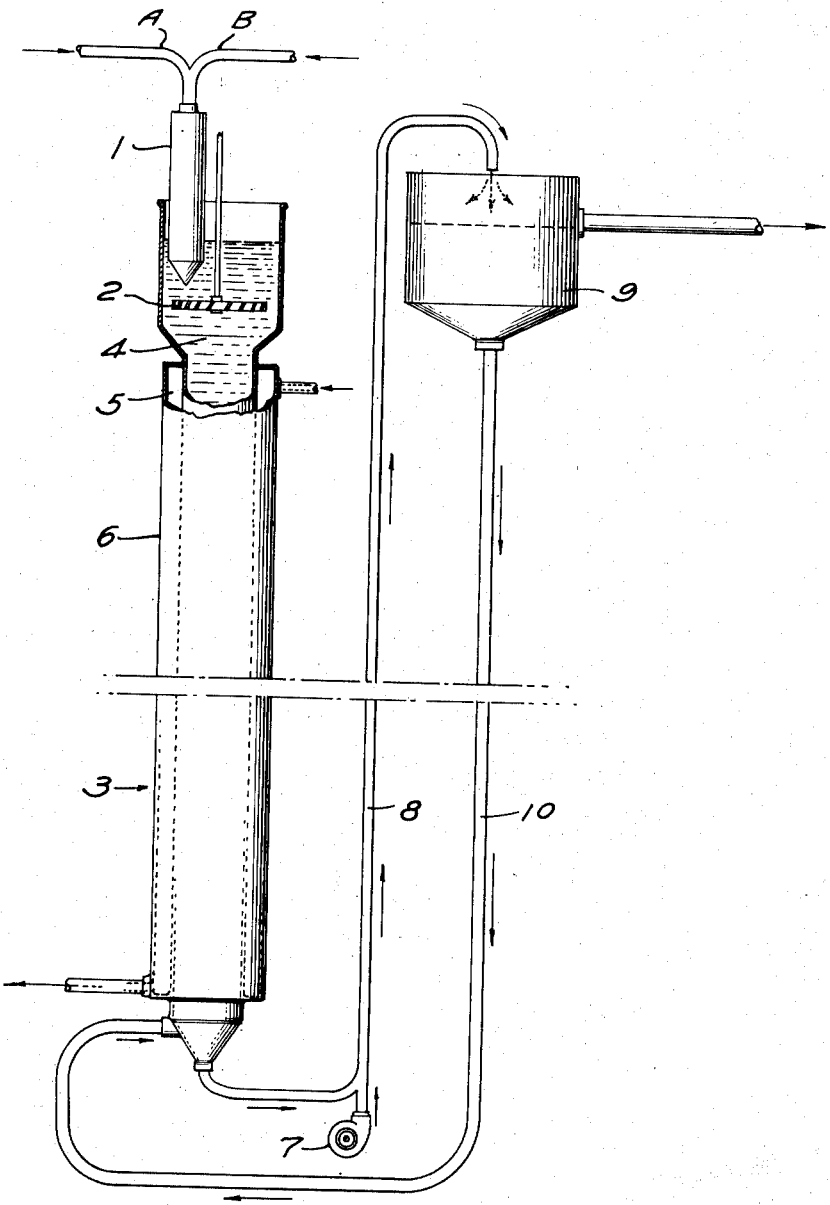
INVENTOR.
HAROLD WALLMAN
BY
Elizabeth Ann Krider
AGENT Patented Sept. 15, 1953

2,652,386

UNITED STATES PATENT OFFICE 2,652,386

CONTINUOUS PREPARATION OF BEADED PHENOLSULFONIC ACID - FORMALDEHYDE CONDENSATION PRODUCT

Harold Wallman, Stamford, Conn., assignor to American Cyanamid Company, New York, N. Y., a corporation of Maine Application February 17, 1949, Serial No. 76,943

4 Claims. (Cl. 260—49)

This invention relates to the production of resinous condensation products in bead form, and more particularly, to the continuous production of ion exchange resin beads directly from the initial resin-forming ingredients.

The production of resins of the thermosetting condensation type such as urea-formaldehyde, melamine-formaldehyde and the like, and particularly resins of the thermosetting condensation type in a cured state such as the ion exchange resins, both anionic and cationic, in the form of spheroidal particles or beads of uniform size has recently been described and claimed in the copending application of Arthur S. Nyquist, Serial No. 77,071, filed February 17, 1949, entitled "Preparation of Non-Nuclearly Sulfonated Phenol-Formaldehyde Resin in Bead Form," now Patent No. 2,610,171, issued September 9, 1952, and in the copending applications of Lennart A. Lundberg, Serial Nos. 77,070, now abandoned, 77,068, 77,069, and 77,067, all filed February 17, 1949, entitled "Preparation of Nuclearly Sulfonated Phenol-Formaldehyde Resin in Bead Form," "Use of Cationic Surface Active Agent in Preparation of Anionic Resin in Bead Form," "Use of Non-Ionic Surface Active Agent in Preparation of Anionic Resin in Bead Form," and "Use of Petroleum Sulfonates in Preparation of Resinous Condensation Products in Bead Form," respectively the last three being Patent No. 2,614,085, issued October 14, 1952, Patent No. 2,610,156, issued September 9, 1952 and Patent No. 2,610,170, issued September 9, 1952, respectively.

According to the disclosures of these applications an aqueous syrup of a resinous, partial condensation product is dispersed in an organic, non-solvent medium by mechanical agitation and in the presence of a surface active agent, and the dispersed globules of the partially condensed product which result become solidified upon gelation of the product and are finally cured by the action of heat.

It is an object of the present invention to provide a new and improved method for the one-step preparation of resinous condensation products in the form of beads or spheroidal particles.

Another object of the present invention is the continuous production of resinous condensation products in bead form.

A further object of the present invention is the production of beads of cured resin.

Still another object of the present invention is the continuous production of ion exchange resin in the form of beads or spheroidal particles.

It is another object of the present invention to continuously prepare ion exchange resins of the condensation type as beads.

It is a further object of the present invention to produce, by a continuous process, beads of cured ion exchange resin.

Still a further object of the present invention is to continuously produce beads or spheroidal particles of a resinous condensation product directly from the initial resin-forming ingredients which condense in a violently exothermic reaction.

It is an object of my invention to prepare beads of a condensation type resin which has a rapid gelation rate.

Another object of my invention is the production in bead form of a cured, insoluble formaldehyde condensation product containing nuclear sulfonic acid groups.

The above and other objects are attained by continuously mixing the initial resin-forming ingredients together and immediately dispersing the mixture obtained in a non-solvent medium by means of suitable agitation. The droplets of dispersed material then pass through the non-solvent medium and become solidified by gelation as they do so. The solidified particles are cured by heat.

The invention will be more clearly apparent by reference to the accompanying drawing in which Fig. 1 is a diagrammatic representation of one form of apparatus suitable for use in carrying out the process of the present invention.

Referring now to Fig. 1, resin-forming ingredients A and B are thoroughly mixed together in mixing pump or nozzle 1, and the mixture is instantaneously discharged past an agitator 2 which disperses it into droplets into a column 3. The column 3 contains a dispersing medium 4 comprising an organic non-solvent liquid and, if desired, a surface active agent, said medium having been preheated to about 100° C. by means of heating medium 5 in heating jacket 6, and its temperature thereafter being maintained by the heat of reaction of the resin formation.

As the droplets of resin-forming material fall through medium 4 in column 3 they solidify as a result of the heat of the resin-forming reaction and are continually removed, as a slurry, from the bottom of the column 3 by an air jet or pump 7 through conduit 8 to filter or centrifuge 9 where they are separated from the dispersing medium 4 which is returned to column 3 through conduit 10.

The initial resin-forming ingredients, when mixed rapidly as in the present process, produce a feed syrup of a very low degree of reaction which must be dispersed immediately in the non-solvent medium before further reaction can take place. After dispersion, the reaction proceeds in each individual droplet or globule, the heat of reaction resulting therefrom causing gelation, and hence solidification, of the droplets to produce resin beads. These may be cured by additional heating in the non-solvent medium or by heating in an oven after separation from the non-solvent medium.

The invention will be described in greater detail in conjunction with the following specific example which is merely illustrative and is not intended to limit the scope of the invention.

*Example*

A 6′x3″ jacketed column is filled with o-dichlorobenzene containing 0.02%, based on the weight of o-dichlorobenzene, of stearyldimethylbenzylammonium chloride ("Triton-K 60"). A two-fluid mixing nozzle, such as #4 BM of the Spray Engineering Company, which discharges just below the top level of the dispersing medium into a 5″x7″ mixing zone at the bottom of which is an air-driven agitator, is provided. Into this nozzle are simultaneously pumped phenol sulfonic acid and 37% aqueous formaldehyde solution in a weight ratio of about 2:1 after the dispersing medium in the column has been heated to 90°–95° C. and with the agitator operating. The resin beads formed drop through the column in about 30 seconds; they are removed from the bottom of the column as a slurry by means of the T Venturi tube there located and then discharged into a gravity filter at a level higher than the column. The filtrate from this filter is returned to the column near its bottom. The beads are cured by heating in an oven for 7 hours at 100° C. and for 16 hours at 150° C.

The process of the present application may be applied to the preparation in bead form of all condensation type, thermosetting resins, the initial resin-forming ingredients of which undergo a sufficiently violently exothermic reaction resulting in sufficiently rapid gel formation. In the preparation of certain condensation type ion exchange resins, for example, there is no noticeable or material change in the viscosity of the reaction mixture over a relatively long period of time after the resin-forming ingredients are combined, while in certain other preparations, the viscosity increases rapidly. The reaction mixture, in either case, suddenly thickens and solidifies; this is known as the gelation point. If the time before gelation is relatively long, the resin is said to have a slow or low gelation rate; if it is relatively short, the resin is a rapid geller or is said to have a high or fast gelation rate. The process of the present invention is only applicable to resins having a relatively fast rate of gelation, i. e., one fast enough so that the resin particles will gel or solidify in the time it takes them to pass through the dispersing medium. No definite limits can be set for this gelation rate except for a given installation since the rate required for success of the installation depends on the temperature of the dispersing medium, its density, the length or height of the column, and the like. In general the rate of gelation must be such that the resin beads will gel as they are passing through the dispersing medium and before they reach the end of the medium. At the same time the gelation rate must be slow enough that gelation will not occur before the dispersed resin droplets are formed. Since dispersion takes place within a fraction of a second after mixing of the reactants, gelation can take place within several seconds after mixing.

Selection of the particular organic non-solvent liquid and surface active agent for the dispersing medium is very important to my process since the proper selection of these materials governs whether or not any resin beads will be formed. The non-solvent medium must be liquid at room temperature, insoluble in water, stable toward heat (up to about 160° C. at least), not readily hydrolyzable, and inert to the resin-forming ingredients, and the resinous reaction products thereof. In addition, it must boil above the temperature at which gelation of the resin takes place at a suitably rapid rate, above about 70° C. Its density should be substantially equivalent to that of the feed syrup, generally from about 1.1 to 1.5, and it must be less than that of the resin beads in order to facilitate dropping of the beads through the column of dispersing medium by force of gravity. Numerous liquids which are suitable are set forth in the aforementioned Lundberg application, Serial No. 77,070, filed February 17, 1949, entitled "Preparation of Nuclearly Sulfonated Phenol-Formaldehyde Resin in Bead Form."

The surface active agent may be cationic or anionic but not all members of a particular class will necessarily be satisfactory for the nuclearly sulfonated resins of my process. Reference to the Lundberg copending application mentioned in the preceding paragraph, the disclosure of which is hereby incorporated herein, will indicate that, for example, for the preparation of beaded resins of the type of the example, cationic quaternary ammonium salts containing a long chain (8–18 carbons) alkyl group and hydroxyalkylamine salts containing a long chain (8–18 carbons) alkyl group are suitable surface active agents. Anionic petroleum sulfonates can also be used as fully described in another of the copending Lundberg applications, namely, Serial No. 77,067 filed February 17, 1949, entitled "Use of Petroleum Sulfonates in Preparation of Resinous Condensation Products in Bead Form."

In general, the surface active agent is chosen so as to establish, under any given set of conditions, an interfacial tension in the system which is within a definite range conducive to the formation of spheroidal particles. Again, it is impossible to set any definite limit on, or range for, the exact amount of surface active agent to be used since it will depend on the agent itself and on the resin involved. It must be enough to produce the desired interfacial tension and, in addition, the amount of agent is governed by the desired particle size since, in general, the more surface active agent used, the smaller the beads. Moreover, for any given set of conditions, other variables remaining constant, considerably less agent is required in the process of the present invention than in a corresponding process wherein a partially condensed resin syrup is first prepared and then dispersed in the non-solvent medium instead of dispersing the initial resin-forming ingredients immediately and instantaneously after mixing.

Resin beads produced in accordance with my process may be cured by heating in an oven at from 90°–160° C., or by maintaining their contact with hot non-solvent medium for a sufficient period of time.

It is an advantage of the present invention that resins which are formed as the result of a rapid, exothermic condensation reaction may be produced in the form of beads or spheroidal particles directly from the initial resin-forming ingredients.

It is another advantage of the present invention that rapid, exothermic reactions can be made to take place in relatively inexpensive equipment.

Another advantage of the present invention resides in the fact that the heat of an exothermic reaction is utilized for heating a gel-forming resin syrup to its gelation point. In the corresponding batch process involving preparation of a resin syrup followed by dispersion in a non-solvent medium, the heat of reaction is dissipated by a cooling medium and heat is then supplied to bring about gelation.

A further advantage of the present invention is the short hold-up time of the reaction ingredients in view of the exothermicity of the reaction.

Still a further advantage of the present invention is the use of less surface active agent in the dispersing medium than is necessary for operation of a corresponding batch process. As a matter of fact, if sufficient agitation is provided and other conditions are favorable, the surface active agent may be omitted entirely from the non-solvent medium used in my continuous process.

It is a further advantage of the present continuous process over the corresponding batch process that the resin syrup is formed, dispersed into droplets and the droplets solidified, all in one operation. In batch processes the resin syrups must first be prepared and their viscosities suitably adjusted, and they are then beaded. In some batch processes for forming resin beads, it is necessary to dilute the resin syrup to adjust its viscosity for dispersion; the low initial viscosity of my "instantaneous" reaction syrup eliminates this need and the beads obtained therefore contain less water which reduces the drying requirements of an installation.

I claim:
1. A process in accordance with claim 3 in which the gelled droplets are cured by heating in the presence of the liquid.
2. A process in accordance with claim 3 in which the gelled droplets are separated from the liquid and then cured by heating in an oven.
3. In a process for the preparation of an insoluble cured phenol sulfonic acid-formaldehyde resin in bead form the steps which comprise continuously mixing together phenol sulfonic acid and aqueous formaldehyde, immediately dispersing the resulting mixture in an inert organic non-solvent liquid containing a surface active agent, the density of said liquid being substantially equivalent to that of said mixture and less than that of the resin beads to be produced, continuously passing the so-obtained droplets of said mixture through said liquid, contact between said droplets and said liquid being maintained at least until said mixture has gelled and the droplets are consequently solidified, and curing the gelled droplets.
4. A process according to claim 3 in which the droplets pass through the liquid by force of gravity.

HAROLD WALLMAN.

References Cited in the file of this patent
UNITED STATES PATENTS

| Number | Name | Date |
|---|---|---|
| 2,441,860 | Whetsone | May 18, 1948 |
| 2,466,675 | Bauman | Apr. 12, 1949 |
| 2,474,911 | Pierce | July 5, 1949 |
| 2,518,420 | Evers | Aug. 8, 1950 |
| 2,582,849 | Ramondt | Jan. 15, 1952 |